United States Patent
Sexton et al.

(10) Patent No.: US 9,871,650 B2
(45) Date of Patent: *Jan. 16, 2018

(54) APPARATUS AND ASSOCIATED METHOD FOR PROVIDING COMMUNICATION BANDWIDTH IN COMMUNICATION SYSTEM

(71) Applicant: BlackBerry Limited, Waterloo (CA)

(72) Inventors: Thomas Sexton, Fort Worth, TX (US); Sagar Dhakal, Richardson, TX (US); Paul James Lusina, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,594

(22) Filed: May 27, 2016

(65) Prior Publication Data

US 2016/0344539 A1 Nov. 24, 2016

Related U.S. Application Data (63) Continuation of application No. 13/531,250, filed on Jun. 22, 2012, now Pat. No. 9,356,774.

(51) Int. Cl.
| | |
|---|---|
| *H04L 12/26* | (2006.01) |
| *H04L 7/04* | (2006.01) |
| *H04W 52/38* | (2009.01) |
| *H04L 5/00* | (2006.01) |

(52) U.S. Cl.
CPC .............. *H04L 7/04* (2013.01); *H04L 5/0048* (2013.01); *H04W 52/386* (2013.01); *Y02B 60/50* (2013.01)

(58) Field of Classification Search
CPC ...... H04L 7/04; H04L 5/0048; H04W 52/386; Y02B 60/50
USPC .......................... 370/252–253, 329–330, 312
See application file for complete search history.

(56) References Cited

U.S. PATENT DOCUMENTS

| | | | | |
|---|---|---|---|---|
| 4,472,784 | A | * | 9/1984 | Blachman ............... G06F 7/588 702/83 |
| 5,412,686 | A | * | 5/1995 | Ling ..................... H04W 52/04 375/147 |
| 5,537,435 | A | * | 7/1996 | Carney ..................... H04J 1/05 370/210 |
| 8,199,765 | B2 | | 6/2012 | Kaneko et al. |
| 9,356,774 | B2 | * | 5/2016 | Sexton ..................... H04L 7/04 |
| 2001/0031626 | A1 | * | 10/2001 | Lindskog .............. G06F 1/3203 455/67.13 |

(Continued)

FOREIGN PATENT DOCUMENTS

WO   2010/0141909   12/2010

OTHER PUBLICATIONS

Chinese Office Action dated Jun. 30, 2016, received for Chinese Application No. 201310191578.5.

(Continued)

*Primary Examiner* — Thai Hoang
(74) *Attorney, Agent, or Firm* — Jon Gibbons; Fleit Gibbons Gutman Bongini & Bianco P.L.

(57) ABSTRACT

An apparatus and an associated method selects rates at which received signals are sampled in a multi-user communication system. The signals are sampled at initial sampling rates during a first period. An estimate is made of the number of received signals, and selection is made of an updated sampling rate, based in part upon the estimate.

20 Claims, 6 Drawing Sheets

(56) References Cited

U.S. PATENT DOCUMENTS

| | | | |
|---|---|---|---|
| 2005/0030976 A1 | 2/2005 | Wentink | |
| 2005/0219068 A1* | 10/2005 | Jones | G01S 5/30 341/50 |
| 2006/0291431 A1* | 12/2006 | Pajukoski | H04L 27/262 370/335 |
| 2007/0070879 A1* | 3/2007 | Yoshida | H04L 5/023 370/208 |
| 2007/0133728 A1* | 6/2007 | Bahng | H04L 27/2676 375/369 |
| 2007/0239450 A1* | 10/2007 | Kienzle | G10L 15/07 704/244 |
| 2008/0219328 A1 | 9/2008 | Sanada et al. | |
| 2008/0244533 A1* | 10/2008 | Berg | G06F 11/3447 717/128 |
| 2011/0051611 A1 | 3/2011 | Chung et al. | |
| 2013/0028100 A1* | 1/2013 | Olgaard | H04L 1/24 370/242 |
| 2013/0148527 A1* | 6/2013 | Awiniyi | H04W 24/02 370/252 |
| 2013/0262192 A1* | 10/2013 | McCarty | G06Q 10/06395 705/7.41 |

OTHER PUBLICATIONS

Chinese Office Action dated Jan. 9, 2017, received for Chinese Application No. 201310191578.5.
Canadian Office Action dated Mar. 11, 2015 received for Canadian Application No. 2,816,252.
Chinese Office Action dated Nov. 4, 2015 received for Chinese Application No. 201310191518.5.
Chinese Office Action for Chinese application No. 201310191578.5 dated May 15, 2017.
English translation of Chinese Office Action dated May 15, 2017 issued in connection with for Chinese application No. 201310191578.5.

* cited by examiner

APPARATUS AND ASSOCIATED METHOD FOR PROVIDING COMMUNICATION BANDWIDTH IN COMMUNICATION SYSTEM

CROSS-REFERENCE TO RELATED APPLICATIONS

This application is continuation of and claims priority from U.S. patent application Ser. No. 13/531,250 filed on Jun. 22, 2012, now Ser. No. 9,356,774; the entire disclosure is herein incorporated by reference in its entirety.

BACKGROUND

The present disclosure relates generally to a manner by which to provide communication bandwidth for communications by communication devices, such as wireless devices of a multi-user, wireless communication system. More particularly, the present disclosure relates to an apparatus, and an associated method, by which to provide bandwidth to the communication devices by selecting sampling rates at which to sample received signals.

The bandwidth is provided without requiring a channel handshake phase. Sampling rates at less than a Nyquist rate are selected while facilitating error-free decoding of received signals.

A communication system provides for communication of information between sets of communication stations that are operable in the communication system. Information that is communicated between the communication devices that are parties to a communication session is communicated upon communication paths that extend between the communication devices. A communication path formed in a cellular, or other multi-user, radio communication system typically includes a part defined upon a radio air interface and a part defined within network infrastructure of the communication system. The part of the communication path that is defined within the network infrastructure for uplink, i.e., reverse link, communications is sometimes referred to as the 'backhaul'. As the availability of bandwidth upon which to define the backhaul, and other, communication paths is finite, the amount of bandwidth that is available constrains the communication capacity of the communication system.

As a result of this constraint, there is a need to make efficient use of the bandwidth that is available pursuant to communication operations. When the communication system comprises a large, multi-user system, the allocation of, or otherwise providing of, bandwidth to multiple communication-station sets to carry out multiple, concurrent communication sessions becomes a challenging task. Conventionally, allocations are made through performance of a channel-assignment, handshake phase. A channel handshake phase, however, requires a signaling exchange between a network control entity and the communication devices. The signaling exchange is resource consumptive, both in processing and bandwidth requirements, including backhaul bandwidth requirements.

The existing procedures are therefore less than ideal. An improved mechanism would therefore be advantageous.

It is in light of this background information related to communications in a communication system that the significant improvements of the present disclosure have evolved.

DETAILED DESCRIPTION

The present disclosure, accordingly, advantageously provides an apparatus, and an associated method, by which to provide communication bandwidth to communication devices, such as wireless devices of a multi-user, wireless communication system.

Through operation of an implementation of the present disclosure, a manner is provided by which to provide bandwidth to the communication devices by selecting sampling rates at which to sample received signals.

In one aspect of the present disclosure, bandwidth is provided without requiring a channel handshake phase to be performed between an allocation entity, such as a network element, and the communication device or devices to which the bandwidth is to be provided. The providing of the bandwidth is carried out in a manner that reduces the amount of signaling overhead required to carry out the allocation, that limits the energy required to sample receive data, and that limits backhaul bandwidth requirements.

Sampling rates of samplers that sample received signals are selected to be less than Nyquist sampling rates while also permitting error-free decoding of received signals. Power savings are provided due to the capability to use less-than-Nyquist sampling rates.

In another aspect of the present disclosure, a MAC "Multiple Access Channel" transmission format is utilized. Communication devices, such as wireless devices operable in a wireless communication system, transmit according to the MAC transmission format, which includes a pilot followed by words of a frame of words. The pilots used by different ones of the communication devices are selected from an orthogonal set of pilot frequencies.

In another aspect of the present disclosure, the words that follow the pilot include a first word and at least a second word. The first word, e.g., is of a short length and forms a short word. And the at least the second word, which follows the first word, forms a long word. The communication devices are maintained in synchronization, such as by synchronization to a global clock, delivered, e.g., by the communication network or, e.g., by a GPS (Global Positioning System) broadcast.

In another aspect of the present disclosure, samplers are positioned to detect transmissions by the communication devices. The samplers are configured to sample a first word interval to sample values of first words transmitted by the communication devices. The samplings of the first words are performed at initial sampling rates, such as the Nyquist rate. When the transmission rates of the communication devices match capacity with the sampling rates, the code word points of the transmitted words have equal separations between their respective nearest neighbors. If a sampling rate is reduced, i.e., is reduced to be less than the Nyquist rate, the equal spacing of the code word points is not maintained.

In another aspect of the present disclosure, the samples detected by the samplers are provided to a controller. The controller is configured to collect and analyze the sampled values. The controller, based upon the analysis of the collected samples, selects whether to cause the samplers to sample additional words, i.e., the at least the second words, transmitted by the communication devices. To make the selection, the controller performs an estimation of the number of communication devices that transmit the pilots and first words that are received and sampled. The controller makes the decision as to whether to cause sampling of the at least second words responsive to the estimation of the number of communication devices. The samples collected by the controller are also utilized to recover the values of the communicated words by each of the estimated communication devices.

In another aspect of the present disclosure, the collected samples are analyzed, and responsive to the analysis, the sampling rates at which the samplers sample received words during at least a second sampling time period are modified. The sampling rates are selected responsive to the analysis of the sampled values collected during the first sampling time period. The modified sampling rates, once selected, are provided to the samplers, and the samplers sample detected values of the at least second words transmitted by the communication devices. By analyzing the collected samples, results of the analysis are used to select modification of the sampling rate. Through appropriate analysis, results are used to modify the sampling rates downwardly, beneath the Nyquist rate, while still providing for error-free recovery of the values of the communicated information.

In another aspect of the present disclosure, parameters are broadcast for delivery to communication devices. The broadcast includes values of parameters that are used by the control devices to select power levels at which pilots and words are transmitted pursuant to the MAC, or other, transmission format. Through appropriate selection of the values of the parameters, the power level that further facilitates the communication of the data is selected. Selection of the power level permitted of individual ones of the communication devices also controls the number of communication devices that are permitted to transmit during an interval, thereby also facilitating error-free decoding of the communicated information.

In these and other aspects, therefore, an apparatus, and an associated method, is provided for facilitating communication-device communications. Samples of first portions of a plurality of communication-device-sourced data are collected. Then, the number of samples is estimated. An updated sampling rate is selected. The updated sampling rate is selected at which to sample additional portions of the plurality of communication-device-sourced data. Selection is made utilizing the estimated number of samples.

Figure 1:
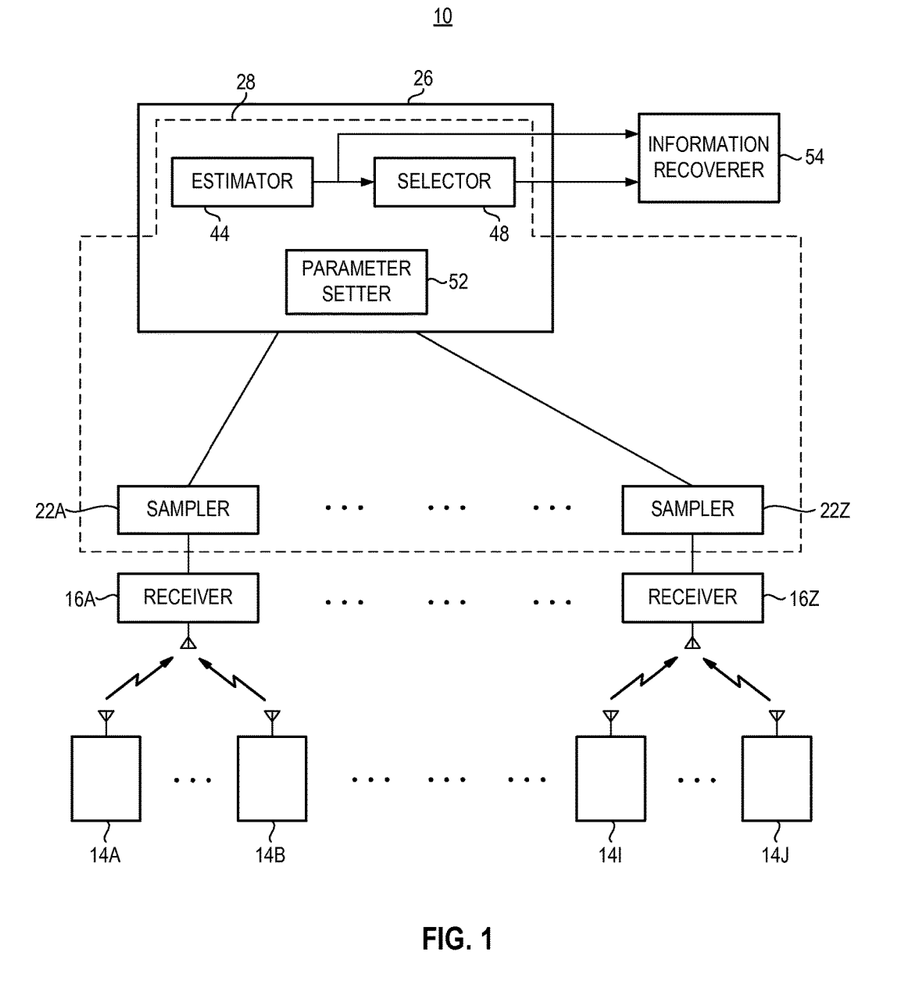
FIG. 1 illustrates a functional block diagram of a communication system that includes an embodiment of the present disclosure.

Referring first, therefore, to FIG. 1, a communication system, shown generally at 10, provides for communications with a plurality of communication devices 14. In the illustrated implementation, the communication system forms a multi-user, wireless communication system that is permitting of multiple concurrent communications of a plurality of the communication devices 14. Communication devices 14A-14J are shown in FIG. 1. The communication system is representative, for instance, of a cellular, or cellular-like, communication system.

The communication system includes a communication network that includes a plurality of spaced-apart receivers 16. A communication device 14 positioned in the communication range of a receiver 16 is capable of communicating by way of communication channels defined upon a radio air interface extending between the receiver 16 and the communication device 14.

In one implementation, the communication system comprises a cellular, or cellular-like, communication system. In this implementation, the receivers 16 are associated with a single base station (not separately shown) and are positioned in communication connectivity with the base station. The receivers 16 are positioned at different locations within a cell defined by the base station. While not separately shown, in one implementation, the base station includes a single transmitter that provides transmit functionality, and the receivers 16 provide the receive functionality of the base station.

Pursuant to an implementation of the present disclosure, samplers 22 are positioned in connectivity with associated receivers 16 and operate to sample, at a selected sampling rate, values of received indications of signals received at associated transceivers 16, and transmitted by communication devices 14, that are. The signals contain data and, in the exemplary implementation, include a pilot followed by data words. Selection of the sampling rate is made for individual ones of the samplers 22. In the illustrated implementation in which there are Z receivers 16, Z samplers 22 are utilized. A sampler 22 is associated with each of the receivers 16.

The samplers 22 are placed in connectivity with a controller 26. The controller 26 is functionally represented in FIG. 1, and is physically implemented in any of various manners, either at a single physical entity or distributed across more than one physical entity. In one implementation, the controller is implemented at a base station of the network part of a cellular communication system.

Functional portions of the controller 26 and samplers 22 form an apparatus 28 of an implementation of the present disclosure. The apparatus facilitates communication in the communication system by causing the received signals sampled by the samplers 22 to be sampled at selected sampling rates. Samples form data samples, sampled during sample periods. The sampling rates are selected to permit reduction in the energy required to operate the samplers while also providing for error-free decoding, or other error-level decoding, of data-containing signals received at the samplers.

The controller includes an estimator 44, a selector 48, a parameter setter 52. The estimator is provided with indications of values of the samples obtained by the samplers 22. The estimator generates an estimate of the number of sample signals obtained, i.e., collected, by the samplers 22. Once the estimate is generated, indications of the estimate are provided to the selector 48. The selector, based upon the estimate, selects whether to cause the samplers 22 to sample additional portions of the signals received at the transceivers 16 and, if so, at what sampling rates. The samples are also utilized, along with the estimations made by estimator 44 to recover the informational content of the sampled values, here represented at an information recoverer 54. The information recoverer 54 is implemented at any appropriate location including, for instance, at a communication endpoint or ultimate destination entity.

The controller further includes a parameter setter 52 that sets operating parameters that utilized during operation of the communication system 10. In one implementation, the parameter includes one or more power-related parameters and the parameter setter further forms a parameter sender that sends power-related parameters to different ones of the communication devices 14 to instruct the communication devices to transmit at particular power levels. The power levels are selected, for instance, to facilitate error-free decoding of received signals.

In operation, each communication device 14, communicates in conformity with a MAC (Multiple Access Channel) transmission format. The jth communication device, i.e., communication device 14-J, when transmitting pursuant to the MAC transmission format, transmits at a power level P with a message Xj and requests a rate RRj. Each of the samplers 22, here samplers 22-1 through 22-Z sample receive messages, i.e., signals containing data, at a sampling rate M1 through MZ, respectively. By sending the messages at appropriate power levels and sampling the detected messages at appropriate sampling rates, the information recoverer 54, to which the samples and estimations are provided, is able to perform error-free decoding to recover the informational content of the messages sent by the various ones of the communication devices.

In exemplary operation of the apparatus 28 of an implementation of the present disclosure, samples obtained by the sampler 22 and provided to the controller 26 are analyzed, and selection is made to set sampling rates of the samplers during subsequent sampling of received data signals. In the exemplary implementation, during a first time period, the samplers sample received signals at the Nyquist rate, and selection made by the selector 48 of the controller 26 selects sampling rates for individual ones of the samplers to be less than the Nyquist rate, if estimations made by the estimator 44 are of values that permit the sampling rates to be reduced. By reducing sampling rates, energy consumed by the samplers is reduced and, also, the bandwidth on the backhaul in the network is correspondingly reduced.

In one implementation, the goal is to maintain error-free decoding of receive data. Achieving error-free decoding is dependent upon several factors, including the symbol constellation that is used in the modulation of the communicated data signals. For a fixed transmit entropy, at some level of signal-to-noise ratio (SNR), the achievable rate is limited by the transmit entropy rather than the SNR. If the transmit entropy supports a desired sampling rate, then the transmission power at which the signal is transmitted is unnecessarily high.

If, for instance, the SNR is adequate to support sampling rates at the channel capacity, but only a fractional portion of the communication devices 14 are communicating, the sampling rate at which a sampler samples the signal can be reduced. For instance, by way of an example, if the SNR is adequate to support user rates at a channel capacity, but only half of the communication devices are transmitting, the sampling rate can be reduced by one half. If no communication devices are transmitting, then the sampling rate can be reduced to zero as no transmitted signal is to be sampled. If sampling continues, the samples are representative of the additive noise and interference. This "half-scenario" example indicates that the power levels at which the communication devices transmit signals and the sampling rates at which the samplers sample signals both contribute to the ability to decode received signals. In operation of an implementation of the present disclosure, the sampling rate of the samplers is adjusted to maintain a receive SNR, thereby allowing error free recovery of the data from each mobile station.

FIGS. 2A through 2D graphically illustrate exemplary operation of a pair of devices, devices 14-1 and 14-2, during an nth frame defined in the exemplary MAC transmission format. Data, formatted into pilot signals and words, is communicated by communication devices and received at receivers. The words, in a frame, include a first, short word, and a second, long word.

Figure 2A:
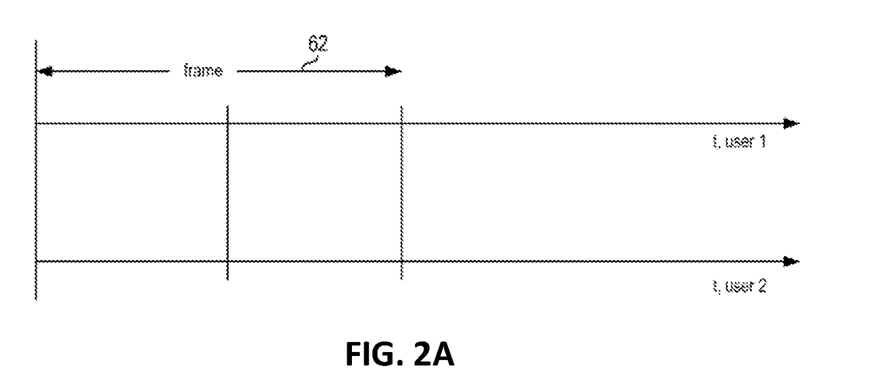
FIGS. 2A, 2B, 2C and 2D illustrate signaling diagrams representative of signaling generated during operation of an exemplary implementation of the present disclosure.

FIG. 2A illustrates a representation when neither of the communication devices 14-1 nor 14-2 transmit during the nth frame 62. When neither devices transmit, the sampling rate of sampler can be set at zero.

Figure 2B:
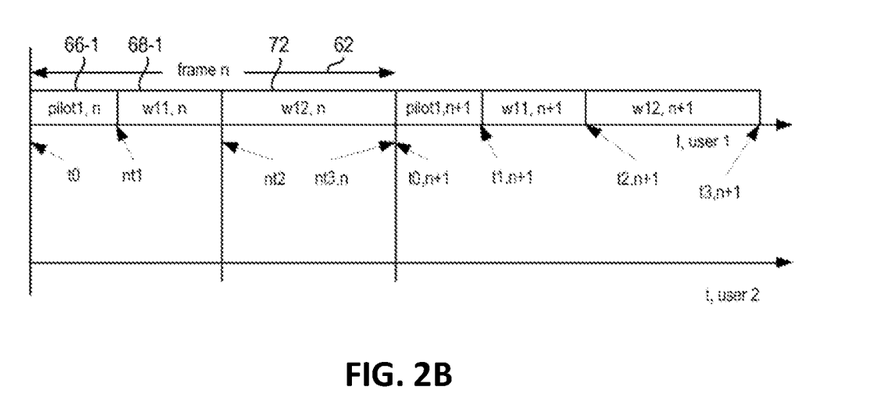

FIG. 2B illustrates a representation of transmission by the communication device 14-1 but not the communication device 14-2. During the nth frame 62, the communication device 14-1 communicates a pilot signal 66 between time periods t0 and t1. Between time periods t1 and t2, the communication device 14-1 transmits a first word 68, a short word, indicated by w11, n. Then, during a subsequent time period, between times t2 and t3 (t2, n–t3n), the communication 14-1 transmits a second word 72, designated as w12, n. FIG. 2B further illustrates analogous transmissions of the pilot, first word, and second word during a subsequent frame, the frame n+1. Because only one of the devices 14 is transmitting, the sampling rate of the sampler can be reduced beneath the Nyquist rate.

Figure 2C:
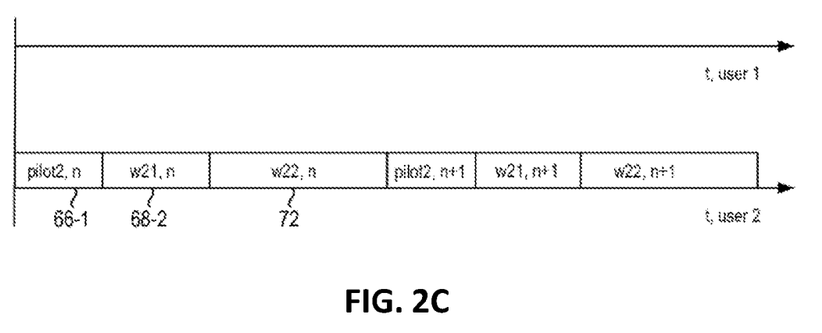

FIG. 2C illustrates a representation in which the user device 14-2 transmits during the nth frame 62, but the communication device 14-1 does not transmit during the nth frame. Analogous to the illustration of FIG. 2B, the user device 14-2 sends a pilot 66 then a short word 68 and then a long word 72. The similar transmission is sent in the frame n+1. Again, because only one of the devices is transmitting, the sampling rate can be reduced beneath the Nyquist rate.

Figure 2D:
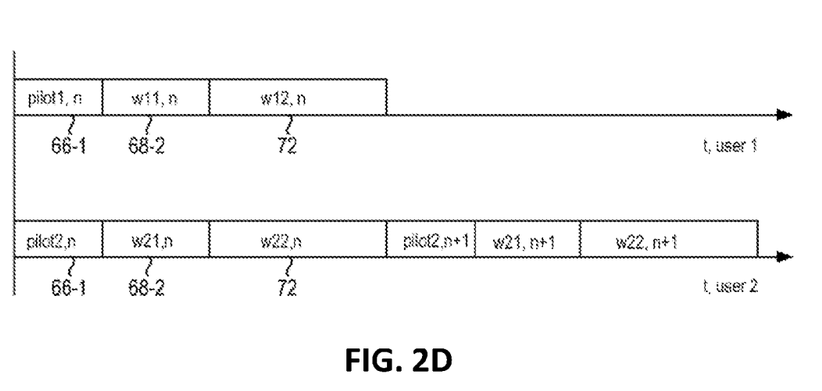

FIG. 2D illustrates a representation in which both communication devices 14-1 and 14-2 transmit during the nth frame 62. The communication device 14-1 transmits a pilot 66, then a short word 68, and then a long word 72 during the frame 62. The communication device 14-2 also transmits a pilot 66 then a short word 68, and then a second word 72 during the frame 62. The illustration of FIG. 2B further illustrates that the communication device 14-2, but not the communication device 14-1, makes a similar transmission during the frame n+1. This Figure is representative of a scenario in which the communication device 14-1 is instructed not to transmit, or in which its transmission is ignored, while permitting the sampling rate of a sampler to be reduced.

Transmissions made by the communication devices 14 are detected by samplers 22 of the communication system 10 shown in FIG. 1. The samplers 22 operate to sample during the time periods t1-t2 to obtain sampled indications of the short words received at the associated transceivers 16. Indications of the samples are provided to the controller 26. A decision is made by the selector 48 of the controller 26 as to whether the samplers 22 should sample long words 72 received during the time periods t2-t3. The decision is based upon an estimate of the number of communication devices that transmit during the short-word interval. The communication devices 14 are synchronized, such as by a global clock delivered by way of a GPS system or a cellular communication beacon or broadcast to facilitate synchronization between the communication devices 14 and the network of the communication system. Sampling is performed by adjusting the number of rows, Mj in a sampling matrix Vj and the jth sampler 22.

The MAC transmission format illustrated in FIGS. 2A through 2D utilizes orthogonal pilots 66. The number of communication devices 14 able to transmit in a manner that permits error-free decoding is dependent upon various factors, including the constellation set of symbols that is used.

As noted above, for a fixed transmit entropy, at a high SNR (Signal-to-Noise Ratio), the achieved rate is limited also by the transmit entropy rather than the SNR. In a sphere-packing argument, for example, the individual code word spheres have gaps in an unused-volume sense. If the transmit entropy is supporting desired rates, then the transmission power is unnecessarily high. In one scenario in which the SNR is adequate to support transmission rates at the channel capacity but only half of the eligible communication devices are communicating, then the sampling rate is able to be reduced by half. If none of the communication devices are transmitting, then the sampling rate is able to be reduced to zero for the remainder of the frame. Ultimately, if the sampling is continued, then the resulting sample is representative of additive noise and interference.

When half of the eligible communication devices are utilized, the transmission power levels of the communication devices and the sampling power of the samplers are selected to facilitate error-free recovery of communicated data. Sampling at the Nyquist rate and setting the SNR so that the offered rate is equal to the capacity in the system is permitted. During operation of an implementation of the present disclosure, the sampling rate is adjusted, while not affecting the SNR, so that the offered rate is at or below the under-sampled capacity, and thereby allowing error free data recovery.

When the transmission rate matches capacity at the Nyquist sampling rate, at dimension N, all of the code word points have equal separations between their respective nearest neighbors. As the sample rate is reduced, equal spacing is generally not retained unless a code word dimension is large in the reduced space with dimension N.

Code words with proper distance properties are used to permit error-free detection of messages from L communication devices that are transmitting during a common time frame. Random codes are usable; however, such codes require significant decoding processing. LDPC (Low-Density Parity-Check) codes are also usable at a reduced computational effort.

Figure 3:
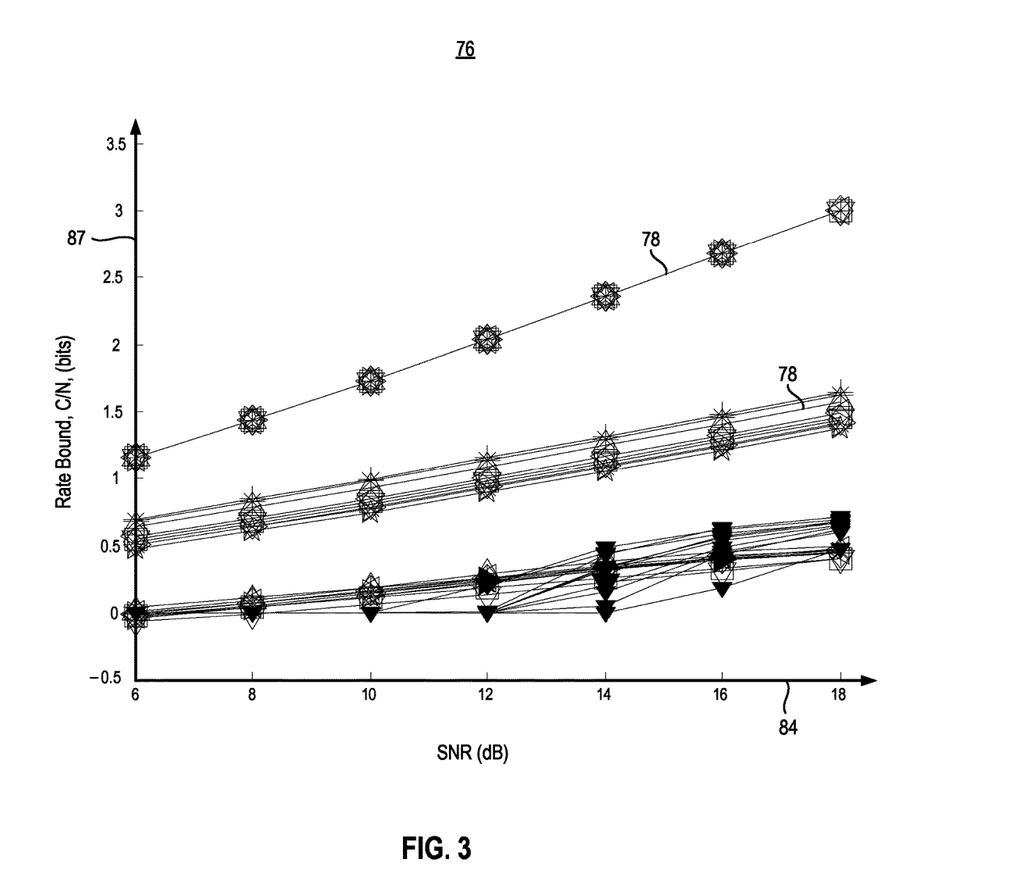
FIG. 3 illustrates a graphical representation illustrating exemplary plots utilized pursuant to operation of an implementation of the present disclosure.

FIG. 3 illustrates a graphical representation 76 illustrating a plurality of plots 78 of rates 82 plotted as a function of SNR (Signal-to-Noise-Ratio) values 84. Plots analogous to the plots 78 are stored at, or otherwise accessible by, the selector 46 and used pursuant to selection of a sampling rate at which the samplers 22 sample received data signals. For a given SNR, a plot 78 is accessed to obtain an appropriate sampling rate is used as the selected sampling rate at which samplers sample received data signals, such as portions of received data forming the long words 72 shown in FIGS. 2A through 2D.

Pursuant to operation of an implementation of the present disclosure, a manner is also provided by which to control behavior of the communication devices 14 by way of an overhead broadcast channel. The parameter $P_0$, noted below, is the required receive power, at a sampler, to detect one communication device, error-free, when no other communication devices are transmitting.

The transmit power level of a communication device 14 is controlled to transmit sufficient power so that power of power level $P_0$ is received at the network of the communication system. To achieve desired throughputs, each communication device 14 is provided with an index, u, when the communication device registers in the system. For example, the ith device 14, i.e., the device 14-I, is provided with an index $U_i$. Preceding each frame interval, a random index shift summand, $S_n$, and a number, mod-boost, are broadcast. The communication device 14-$i$ computes the values $P_i = \text{modboost}(U_i + S_n)$, where boost is an integer. The communication device 14-$i$, when transmitting during a frame, transmits at a power level $P_i = P_0 + \Delta + P_i$ dB where $\Delta$ is a broadcast value such as, e.g., 2 dB. Thereby, selected communication devices are permitted to transmit at power levels great enough to be received and sampled.

In an alternate implementation, the communication device 14-$i$ also observes a number threshold, $n_T$ and number, $\text{mod}_\text{skip}$ that is broadcast by the network along with the value $S_n$. The communication device 14-$i$, responsive to the received parameters, computes a gating function, $g_i = \text{MOD}_{\text{mod}}^{\text{skiP}}(u_i + s_n)$. The communication device then tests the value of the gating function to see if the value is less than or equal to the number threshold. If not, the communication device is unable to transmit during the frame. In this implementation, the constellations of symbol values that the communication device is used and the value of the number threshold is determinable.

In this exemplary implementation, signals received at the network by the plurality of communication devices 14 all transmit at the same power levels. The number of communication devices that are permitted to communicate, however, is constrained to facilitate error-free decoding of information contained in received signals.

In another implementation, the samplers 22 sample at sampling rates $m_i < N$. Sample values are provided to the controller 26. If the controller determines that the sampling rate is too low, then the controller commands, by way of an overhead channel, that the active communication devices transmit using encoding of the data. The encoding provides incremental redundancy to compressive sensing. In this implementation, the controller 26 also instructs the samplers 22 to sample at a higher sampling rate, up to a value equaling N.

Figures 4, 6:
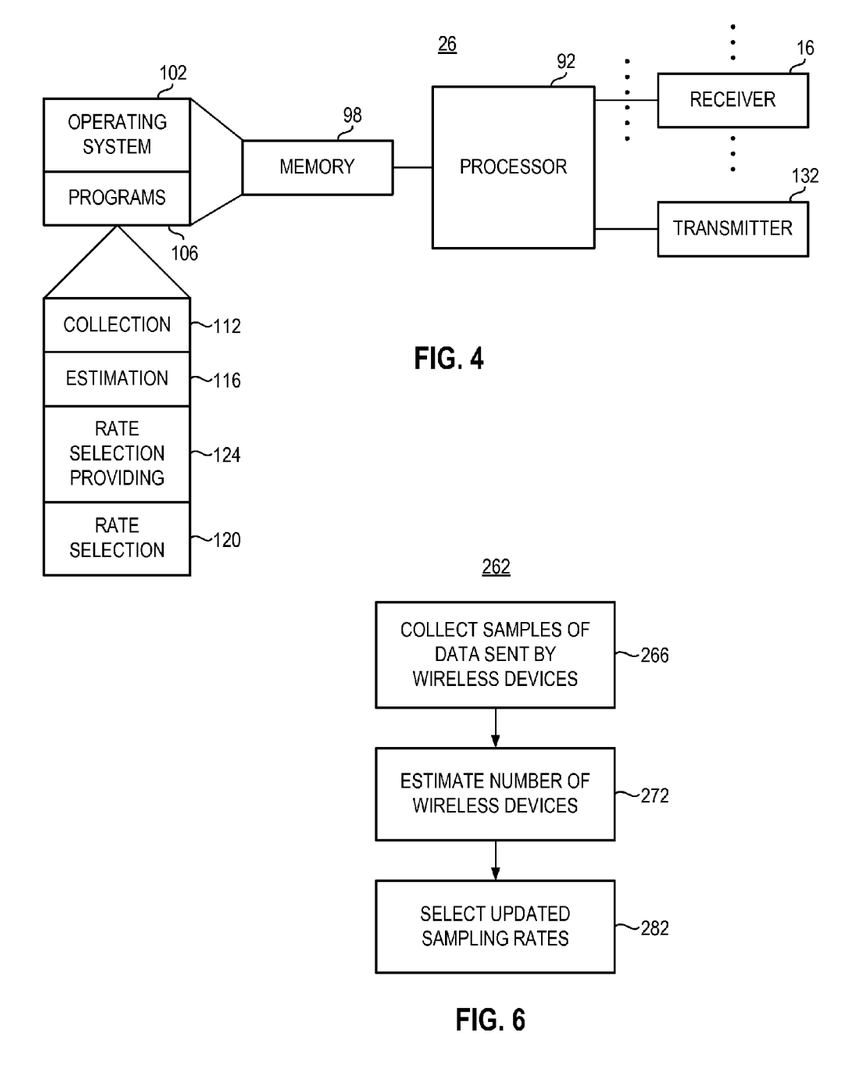
FIG. 4 illustrates a functional block diagram of an exemplary implementation of a controller that forms part of the communication system shown in FIG. 1.
FIG. 6 illustrates a method flow diagram representative of the method of operation of an implementation of the present disclosure.

FIG. 4 illustrates the controller 26 pursuant to an exemplary implementation of the present disclosure. The controller 26 here includes a processor 92 that is capable of executing program codes to carry out the function of the controller. In the exemplary implementation, the processor accesses memory contents of a memory element 98. The memory element stores data that defines an operating system 102 and programs 106 that are executed by the processor 92 during operation of the controller. The programs 106 here include a collection module 112, an estimation module 116, a selection module 120, and a rate providing module 124.

The processor is also configured to receive input information of indications provided by the receivers 16. And, certain messages generated by the processor 92 are provided to a transmitter 132 for transmission therefrom, such as to a communication device 14, shown in FIG. 1.

During operation, the collection module 112 is invoked to collect representations of sampled indications provided by the receivers 16. The estimation module 116 is invoked to obtain estimate of the number of collected representations, that is, the number of communication devices having messages detected by the receivers 16.

The rate selector module 128 is invoked to provide the selection made by the selection module to the receiver 16.

The rate providing module is invoked to cause generation of a message that is provided to a transmitter 132 to transmit operating parameters to communication devices 24 (shown in FIG. 1). Parameters include, for instance, power levels at which messages are to be sent by the communication devices 24 and which communication devices 24 are permitted to transmit messages.

Figure 5:
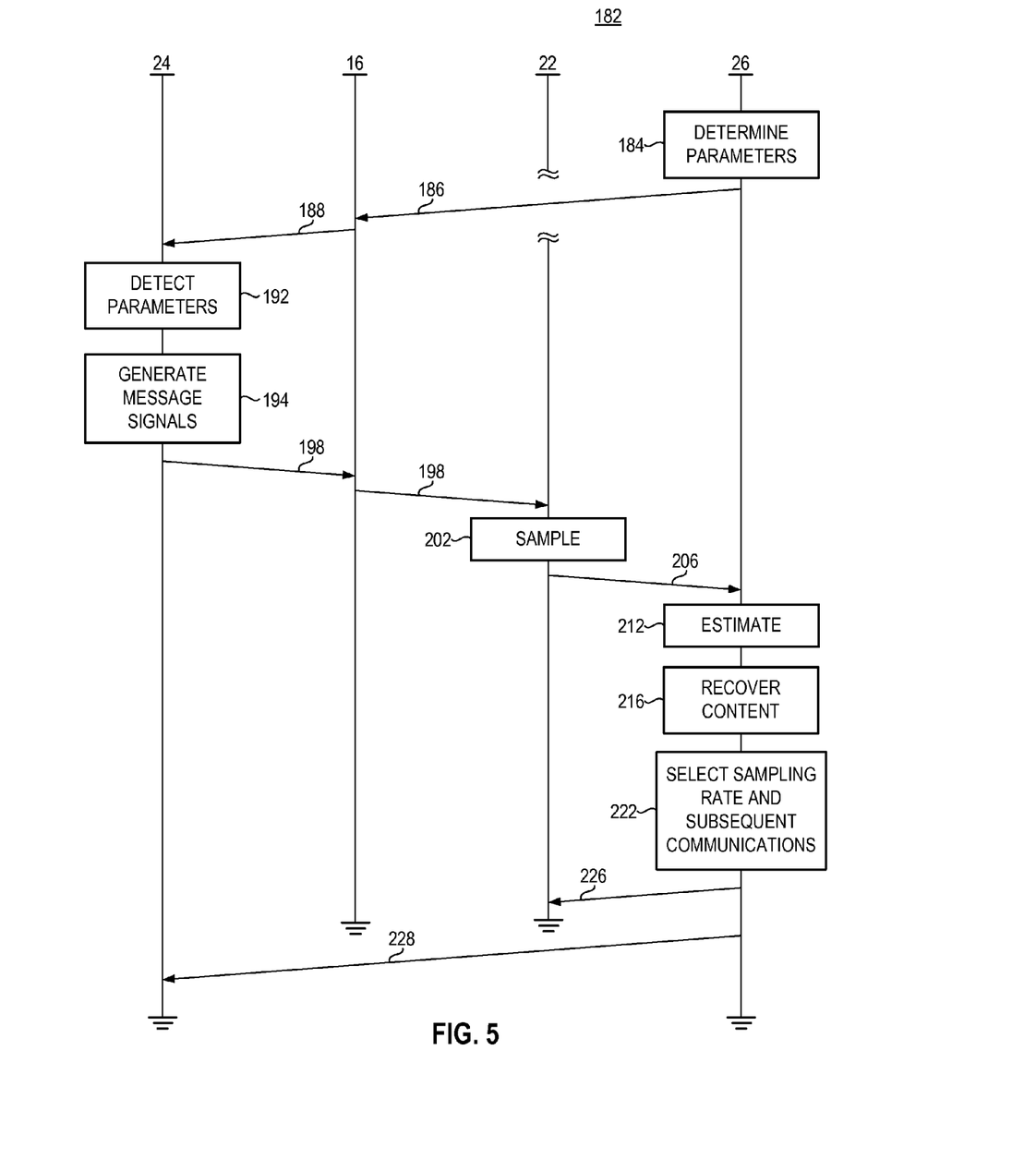
FIG. 5 illustrates a sequence diagram representative of exemplary operation of an implementation of the present disclosure.

FIG. 5 illustrates a sequence diagram 182 representative of exemplary operation of an implementation of the present disclosure. The diagram 182 illustrates signaling between a single communication device 14 and entities of the network part of the communication system shown in FIG. 1.

First, and as indicated by the block 184, parameters related to signaling to be generated by communication devices, such as the communication devices 14 shown in FIG. 1, are determined at the controller 26. Once determined, the parameters are provided, indicated by the segment 186, to a transmitter of a base station to which receivers 16 are connected. Indications of the parameters are caused to be sent, such as by way of a broadcast message, indicated by the segment 188, for delivery to communication devices, here a communication device 14. The parameters sent to the communication device 14 are detected, indicated by the block 192. And, the communication device 14 utilizes the provided parameters in the generation of signals that are formed pursuant to the aforementioned MAC transmission format, indicated by the block 194. The MAC-transmission-formatted message 198 is sent to a receiver 16, and representations of the message received at the receiver are sampled, indicated by the block 202, at a sampling rate. Sampled indications are provided, indicated by the segment 206, to the controller 26. The receiver 16 analogously also detects messages transmitted by other communication devices 14 and the other signals are also sampled by the sampler 202. The samples provided to the controller 26 are used to estimate, indicated by the block 212, the number of communication devices that send messages that are received at a receiver 16. The samples are also used, indicated by the block 216, to recover the informational content of the messages. Additionally, and as indicated by the block 222, the controller 26 further selects whether to cause the communication device to transmit during a subsequent time period and at what sampling rate such signal should be sampled by the sampler 16. Commands that indicate the selections are provided, here represented by the segments 226 and 228. In one implementation, the controller provides a power indication that is determinative of the power level at which the communication device 24 continues transmission.

FIG. 6 illustrates a method flow diagram 262 representative of the method of operation of an implementation of the present disclosure. The method facilitates wireless-device communications. First, and as indicated by the block 266, samples of the first portions of a plurality of wireless-device-sourced data, sampled at an initial sampling rate, are collected.

Then, and as indicated by the block 272, the number of samples that are collected are used to estimate the number of collected samples and, hence, wireless devices. Then, and as indicated by the block 176, an updated sampling rate is selected at which to sample additional portions of the plurality of wireless-device-sourced data.

Then, and as indicated by the block 282, additional portions of the plurality of wireless-device-sourced data is sampled at an updated sampling rate during a second time period.

Thereby, through operation of an implementation of the present disclosure, a manner is provided by which to facilitate the communication of data in manner permitting error-free decoding of received information. Improved communications are permitted as the bandwidth required to permit error-free decoding is provided without requiring a channel assignment handshake phase.

The previous descriptions are of preferred examples for implementing the invention, and the scope of the invention should not necessarily be limited by this description. The scope of the present invention is defined by the following claims.

What is claimed is:

1. A method for operating upon a received signal, said method comprising:
   sampling the received signal at an initial sampling rate;
   estimating a number of wireless-device transmissions from the received signal; and
   commanding at least one of:
      changing the initial sampling rate to an updated sampling rate, and
      a user equipment transmission adjustment to avoid an error-floor condition due to operating outside of a rate-region of a multiple access system.

2. The method of claim 1 wherein the transmission adjustment is a power level.

3. The method of claim 2 wherein the transmission adjustment is an incremental redundancy command.

4. The method of claim 1, wherein the initial sampling rate is at a sub- Nyquist sampling rate.

5. The method of claim 1, including collecting samples of first portions of the received signal, sampled at the initial sampling rate.

6. The method of claim 1 including selecting the updated sampling rate to sample additional portions of the received signal.

7. The method of claim 1 wherein the received signal comprises a pilot signal followed by data words.

8. The method of claim 7 wherein said collecting samples of the first portions comprises collecting samples of the first words of the data words.

9. The method of claim 1 further comprising sending a message to a wireless device containing an indication of power levels at which to transmit additional portions of data.

10. The method of claim 1 further comprising providing indication of the updated sampling rate to samplers that sample the wireless device sourced data that is collected during said sampling.

11. The method of claim 1 further comprising recovering informational content of the received signal.

12. A method for facilitating communication by a wireless device, said method comprising;
   receiving at the wireless device a network-oriainated indication of a power level at which messages are to be received at the network;
   estimating a number of wireless-device transmissions from the received signal;
   adjustng a condititonal transmit power level of the wireless device in response to said indication; and
   transmitting, at the conditional transmit leve, data formatted into pilot signals and words.

13. The method of claim 1, including receiving a further message containing an indication of an adjusted power level at which to transmit the additional portions of data.

14. The method of claim 1, wherein said data is transmitted in a MAC transmission format.

15. An apparatus for wireless communications, said apparatus comprising:
   a processor configured to:
      sample the received signal at an initial sampling rate;
      estimate a number of wireless-device transmissions from the received signal; and command at least one of:
- changing the initial sampling rate to an updated sampling rate, and
- a user equipment transmission adjustment to avoid an error-floor condition due to operating outside of a rate-region of a multiple access system.

16. The apparatus of claim 15 wherein said processor is further configured to collect samples of first portions of the received signal, sampled at the initial sampling rate.

17. The apparatus of claim 16 wherein said processor is further configured to select the updated sampling rate to sample additional portions of the received signal.

18. The apparatus of claim 16, wherein the initial sampling rate is at a sub-Nyquist sampling rate.

19. The apparatus of claim 16, wherein the processor is further configured to collect samples of first portions of the received signal, sampled at the initial sampling rate.

20. A non-transitory computer readable medium storing a program causing a computer to execute wireless communication, said method comprising:
- sampling the received signal at an initial sampling rate;
- estimating a number of wireless-device transmissions from the received signal; and
- commanding at least one of:
  - changing the initial sampling rate to an updated sampling rate, and
  - a user equipment transmission adjustment to avoid an error-floor condition due to operating outside of a rate-region of a multiple access system.

* * * * *

UNITED STATES PATENT AND TRADEMARK OFFICE
CERTIFICATE OF CORRECTION

PATENT NO.         : 9,871,650 B2
APPLICATION NO.    : 15/167594
DATED              : January 16, 2018
INVENTOR(S)        : Thomas Sexton et al.

It is certified that error appears in the above-identified patent and that said Letters Patent is hereby corrected as shown below:

In the Claims

In Column 10, Line 48, delete "network-oriainated" and insert -- network-originated --

In Column 10, Line 53, delete "adjustng" and insert -- adjusting --

Signed and Sealed this
Twenty-ninth Day of May, 2018

Andrei Iancu
*Director of the United States Patent and Trademark Office*